United States Patent
Ryan et al.

(10) Patent No.: US 9,058,283 B2
(45) Date of Patent: Jun. 16, 2015

(54) CACHE ARRANGEMENT

(75) Inventors: Stuart Ryan, Bristol (GB); Andrew Michael Jones, Bristol (GB)

(73) Assignee: STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 255 days.

(21) Appl. No.: 13/560,559

(22) Filed: Jul. 27, 2012

(65) Prior Publication Data

US 2013/0031313 A1    Jan. 31, 2013

(30) Foreign Application Priority Data

Jul. 28, 2011    (GB) .................................. 1112976.4

(51) Int. Cl.
*G06F 12/00* (2006.01)
*G06F 12/08* (2006.01)

(52) U.S. Cl.
CPC ........ *G06F 12/0897* (2013.01); *G06F 12/0811* (2013.01); *G06F 12/0802* (2013.01); *G06F 2212/6022* (2013.01); *G06F 12/0862* (2013.01)

(58) Field of Classification Search
CPC ............ G06F 12/0802; G06F 12/0811; G06F 12/0862; G06F 12/0897; G06F 2212/6022
See application file for complete search history.

(56) References Cited

U.S. PATENT DOCUMENTS

| 4,503,497 A | 3/1985 | Krygowski et al. |
| 5,898,849 A | 4/1999 | Tran |
| 7,356,650 B1 * | 4/2008 | Englin et al. ................... 711/138 |
| 2011/0072218 A1 * | 3/2011 | Manne et al. ................. 711/136 |

FOREIGN PATENT DOCUMENTS

| EP | 0449540 A2 | 10/1991 |
| EP | 449540 A2 * | 10/1991 |
| GB | 2348024 A | 9/2000 |

OTHER PUBLICATIONS

Great Britain Search Report and Written Opinion dated Nov. 16, 2011 from corresponding Great Britain Application No. 1112976.4.

* cited by examiner

*Primary Examiner* — Shawn X Gu
(74) *Attorney, Agent, or Firm* — Allen, Dyer, Doppelt, Milbrath & Gilchrist, P.A. Attorneys at Law

(57) ABSTRACT

A first cache arrangement including an input configured to receive a memory request from a second cache arrangement; a first cache memory for storing data; an output configured to provide a response to the memory request for the second cache arrangement; and a first cache controller; the first cache controller configured such that for the response to the memory request output by the output, the cache memory includes no allocation for data associated with the memory request.

10 Claims, 4 Drawing Sheets

CACHE ARRANGEMENT

CROSS REFERENCE TO RELATED APPLICATIONS

This application claims the priority benefit of Great Britain patent application number 1112976.4, filed on Jul. 28, 2011, which is hereby incorporated by reference to the maximum extent allowable by law.

BACKGROUND

1. Technical Field

The present disclosure relates to a cache arrangement.

2. Discussion of the Related Art

Data caching is a technique which exploits a property of data access known as temporal locality. Temporal locality means that data that has been accessed recently is the data most likely to be accessed again in the near future. Data caching involves storing or caching a copy of recently accessed data in a cache memory that is accessible more quickly and efficiently than the primary memory from which the data was originally obtained. If the same data is requested again in the future, the cached copy of the data can be retrieved from the cache memory rather than retrieving the original data from the primary memory. As the cache memory can be accessed more quickly than the primary memory, this can increase the overall speed of data retrieval.

Some systems employ a technique known as data pre-fetching in which data may be retrieved, possibly speculatively, before it is actually needed in order to increase the overall speed of memory access. Data pre-fetches may be regarded as being speculative in the sense that the pre-fetched data may not eventually be required.

The pre-fetched data is stored in the cache and is treated as cached data. In this way, when the pre-fetched data is actually requested, the cache will be checked to determine whether the requested data is located there.

In some systems, an interconnect may be provided between the cache memory and the primary memory. If the interconnect is limited or shared with the number of resources, pre-fetch requests may contribute to latency to this interconnect. This may result in the latency in the overall system being increased.

SUMMARY

According to a first aspect, there is provided a first cache arrangement comprising: an input configured to receive a memory request from a second cache arrangement; a first cache memory for storing data; an output configured to provide a response to said memory request for said second cache arrangement; and a first cache controller; said first cache controller configured such that for said response to said memory request output by said output, said cache memory comprises no allocation for data associated with said memory request.

According to another aspect, there is provided a cache system comprising: a second cache arrangement comprising a second cache memory, a second cache controller, a first input configured to receive a memory transaction, an output configured to output said memory transaction in response to a miss, and a second input configured to receive a response to said memory transaction; and a first cache arrangement comprising a first cache memory, a first cache controller, an input configured to receive said output from said second cache arrangement and an output configured to provide a response to said memory transaction to said second input of the second cache arrangement, said system being configured such that data associated with said memory request is validly allocated in said second cache memory and not said first cache memory.

According to a further aspect, there is provided a method comprising: receiving a memory request from a second cache arrangement; providing by a first cache arrangement a response to said memory request to said second cache arrangement; and ensuring no allocation for data associated with said memory request is provided in a first cache memory of the first cache arrangement.

According to a further aspect, there is provided a method comprising: receiving in a second cache arrangement a memory transaction; outputting said memory transaction in response to a miss to a first cache arrangement, providing a response to said memory transaction from said first cache arrangement to said second cache arrangement, and validly allocating data associated with said memory request in said second cache arrangement and not in said first cache arrangement.

BRIEF DESCRIPTION OF THE DRAWINGS

For a better understanding of some embodiments, reference will now be made by way of example only to the accompanying figures which show.

DETAILED DESCRIPTION

Figure 1:
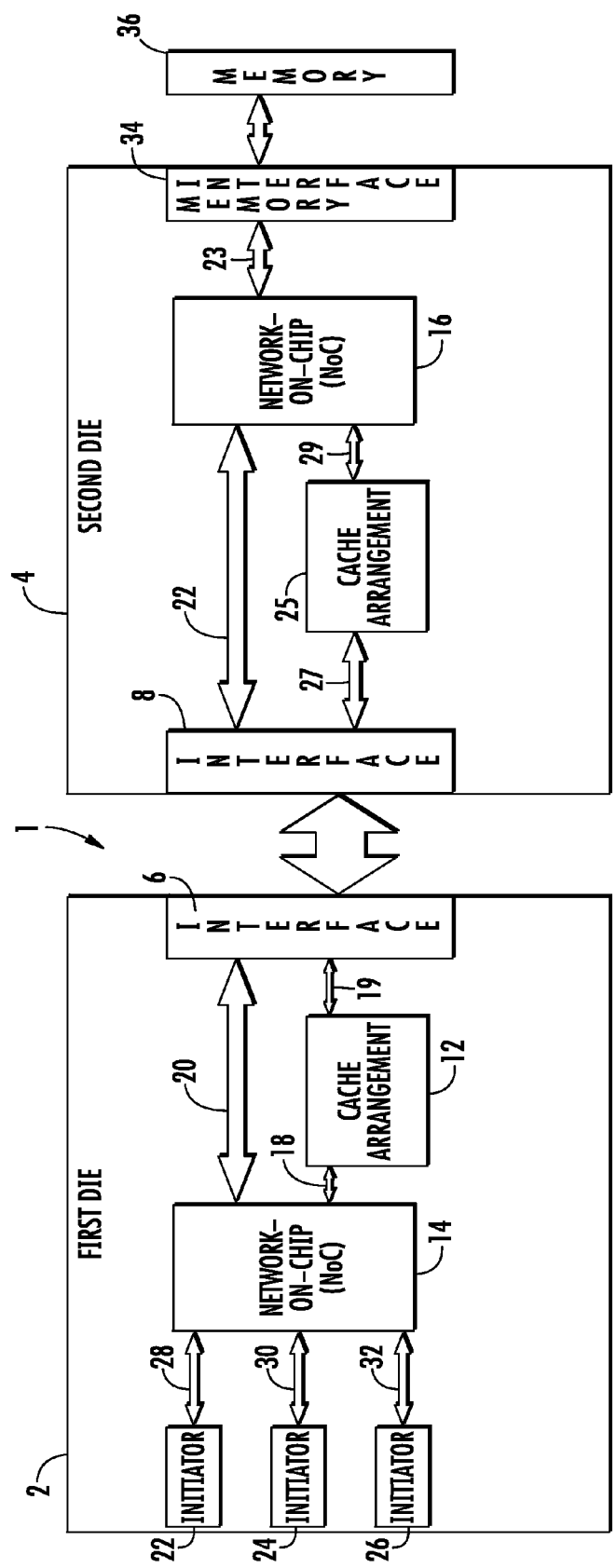
FIG. 1 shows an example of a system in which embodiments may be used.

Some embodiments may be used where there are more than one die within a single package. In particular, a plurality of integrated circuit dies may be incorporated within a single package. In the following examples, a single package having two dies is described. However it is appreciated that this is by way of example only and more than two dies may be provided in some embodiments in the same single package.

For example, the decreasing feature size in CMOS silicon processes allows digital logic to shrink significantly in successive fabrication technology. For example, an area reduction of 55% may be obtained when comparing a digital logic cell implemented in 90 nanometer technology with a digital logic cell implemented in 65 nanometer technology. However, analog and input/output cells tend to shrink much less if at all in these implementations. This may lead to increasingly pad limited designs in many complex system-on-chips (SoC). A pad limited design can be considered wasteful if the digital logic is not implemented as densely as it might be if it were the determining factor in the device area.

Another factor in some embodiments is that the transition, for example, to a sub 32 nanometer design may introduce a dichotomy between supporting low voltage, high speed input/output logic such as DDR3 (Double Data Rate) RAM (Random Access Memory) 1.5 V @ 800 MHz or higher on the one hand and higher voltage interconnect technologies, for example HDMI (High Definition Multimedia Interface), SATA (Serial Advanced Technology Attachment), USB3 (Universal Serial Bus), etc. The lower voltage DDR3 interface may require a lower transistor gate oxide thickness as compared to the HDMI technology. This may be incompatible within a standard process.

Porting of high speed analog interfaces to a new process consumes a lot of resources in terms of time and expert attention. Decoupling the implementation of analog blocks from that of digital blocks of the system may allow a reduction in time to working silicon.

By splitting a traditional monolithic system-on-chip into a plurality of dies in order to form a system in package comprising two or more dies, advantages can be achieved. For example, each die may be designed to provide a particular function which may require various different mixes of analog and digital circuitry in the implementation of the particular function. This means that in some embodiments, it may be possible to use the same die or same design for a die in different packages. This modularity may reduce design time.

Embodiments may be used where there are two or more dies in the package. Embodiments may be used where the dies are manufactured in different technologies. Embodiments may be used alternatively or additionally where it is advantageous for at least one of the dies to be certified, validated or tested independently for conformance to, for example, a standard. Embodiments may alternatively or additionally be used where one of the dies contains special purpose logic to drive specific wireless, optical or electrical interfaces so that the other die or dies can be manufactured independently and not incur any costs associated with the special purpose logic. Embodiments may alternatively or additionally be used where one of the dies contains information, for example encryption information, which is to be withheld from the designers/manufacturers of the other die or dies. Embodiments may alternatively or additionally be used where one of the dies contains high density RAM (Random Access Memory) or ROM (Read Only Memory) and it is preferable to separate this from standard high speed logic for reasons of fabrication yield and/or product flexibility.

It should be appreciated that some embodiments may have additional or alternative advantages other than those discussed previously.

Reference is made to FIG. 1 which schematically shows a system in package 1 having a first die 2 and a second die 4.

The first die 2 comprises three initiators 22, 24 and 26. These initiators are configured to issue requests. By way of example only, these requests may comprise memory transactions for a memory 36 associated with the second die 4. Each initiator is arranged to have a respective communication path 28, 30 and 32 with a network-on-chip 14. By way of example only, the communication paths 28, 30 and 32 may comprise a respective interconnect. The paths may be bidirectional. The paths allow the initiator to issue requests and to receive responses to those requests. The network-on-chip will route the requests to the correct destination as well as the responses to the requests. As is schematically shown in FIG. 1, the network-on-chip 14 is connected via a communication path 18 to a cache arrangement 12. This will be described in more detail later. The network-on-chip 14 is connected to an interface 6 via a communication path 20. The communication paths 18 and 20 may be interconnects. The communication paths 20 may bidirectional as may communication path 18.

A communication path 19 is provided between the cache arrangement 12 and the interconnect 6. The communication path may be bidirectional. The communication path 19 may be an interconnect. This will be described in more detail in relation to FIG. 2.

The interface 6 interfaces with an interconnect 10. The interconnect 10 may have a plurality of connections which allow the interface 6 to send and receive communications to and from the interface 8 of the second die 4.

The second die 4 has a network-on-chip 16 and a memory interface 34. The network-on-chip 16 is arranged to communicate with the interface 8 via communication path 22 and with the memory interface 34 via communication path 23. One or both of these communication paths may be an interconnect. One or both of these communication paths may be bidirectional. The memory interface 34 is arranged to interface with a memory 36. As shown in the arrangement of FIG. 1, this memory 36 is outside the second die 4. However, it should be appreciated that in some embodiments, the memory may be at least partially provided in the second die 4.

The second die also has a cache arrangement 25 which has a communication path 27 with the interface 8 and a communication path 29 with the network on chip 16. One or both of these communication paths may be bidirectional. One or both of these communication paths may be an interconnect.

In the arrangement shown in FIG. 1, memory mapped transactions are issued from an initiator, for example one of the initiators 22, 24 or 26. The transactions issued by the initiator may include address information which is used by the network-on-chip to route the transactions. On the second die 4, the transaction may be received and routed to a destination dependent on the address information. In the case of the memory transaction, the transaction will be routed to the interface so that the memory can be written to or read from, as required. In some embodiments, communication between the two dies will be read and write transactions to memory address space associated with a respective die.

In order to simplify the explanation of some embodiments, the following will assume that the initiator on the first die will read and write transactions to the memory 36 associated with the second die. However, it should be appreciated that in practice, the relationship between the two dies may be more complex and so, for example, the second die may also have initiators which may want to communicate with a memory which is either accessed via the first die or part of the first die.

In some embodiments, the memory transactions may be carried by a sequence of packets over the interface between the two dies. However, it should be appreciated that the memory transactions can be transferred across the interface in any other suitable way.

In arrangements such as shown in FIG. 1, the interface between the dies provided by the interface 6 on the first die and the interface 8 on the second die and the interconnect 10 there between provides a transparent mechanism for an initiator on one die, for example initiator 22, 24 or 26 on the first die to access system memory space located or associated with another die, in this case the second die 4 and the memory 36.

The physical connection of interconnect 10 between the two interfaces is relatively narrow and has to carry traffic from various sources. Accordingly, accessing a memory on a different die or associated with a different die may have a greater latency than accessing a memory location which maps to the same die as the requesting initiator. An increase in memory latency may lead to a decrease in effective CPU performance as the processor (initiator) may need to stall until a response to a memory request is received. In order to reduce the latency seen by the initiators making memory requests to a different die, a cache arrangement may be provided on the first die and the second die.

Some embodiments may make use of spatial locality. The data stored in a memory location close to a previously requested address is likely to be used. Pre-fetching allows the cache to extend the range of the spatial locality being exploited beyond the intrinsic size of the cache line.

Consider the case of where there is a miss on the cache. A cache miss is where the required data is not stored in the cache and the data needs to be read from the memory. If there is a miss on the cache, there is a latency cost required for accessing the memory. One technique for reducing the likelihood of a miss is to implement pre-fetch. The pre-fetch mechanism can be controlled in any suitable way through, for example, explicit software commands or autonomously by the cache controller itself.

Traditionally every transaction crossing the interconnect 10 contributes to "head of line blocking". That is, transactions which follow a particular transaction wait for transactions ahead of it in some logical queue before it can cross from one die to another. A heavily loaded shared link could in some circumstances collapse. The the latencies seen by all users of the link may increase considerably.

In one embodiment, the cache arrangement of the first die may not support pre-fetching and the cache arrangement of the second die may support data pre-fetching. Data pre-fetching is where a prediction is made as to what data will be required and that data is retrieved, possibly speculatively. This may be based for example on one or more addresses from which data has actually been retrieved. In one embodiment, addresses adjacent to an address from which data has actually been retrieved may be candidates for a pre-fetch.

In some embodiments, the latency seen by a read request across from one die to another may be influenced by the latency for crossing the links between the dies as well as the latency of the remote memory system.

Figure 2:
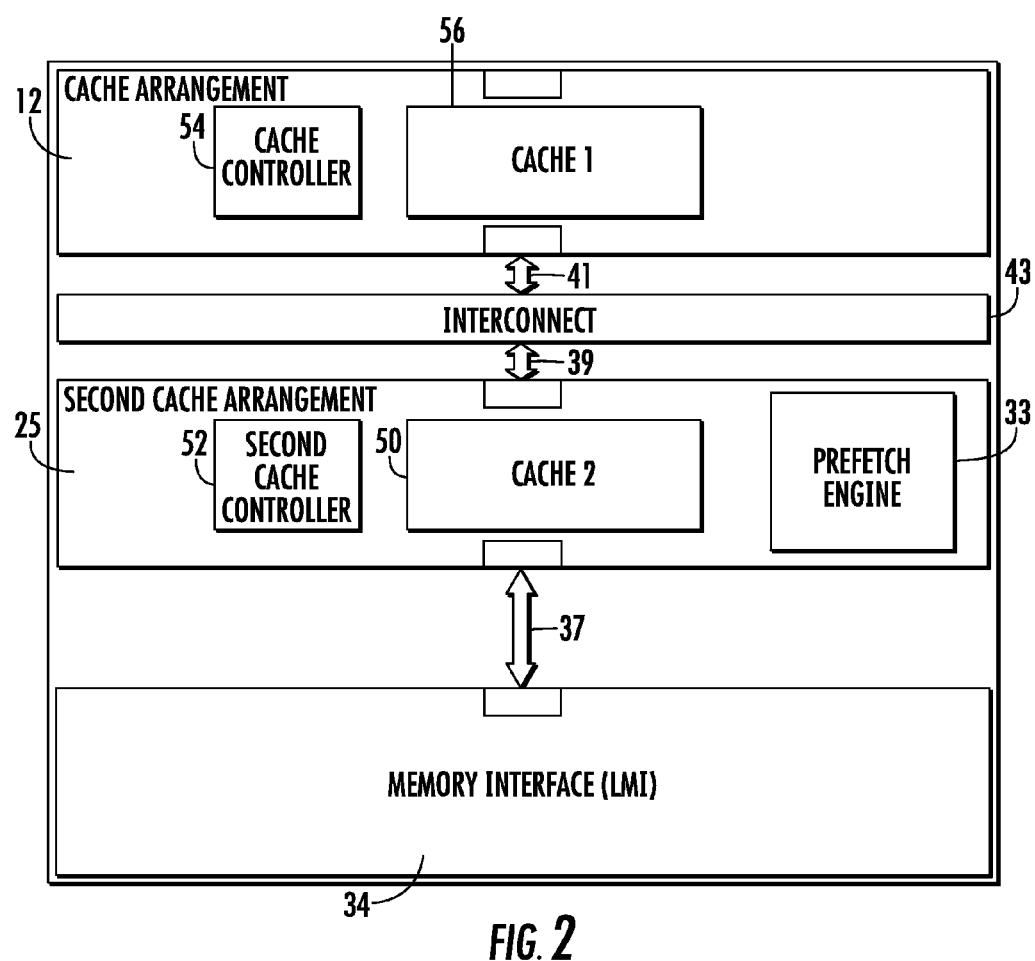
FIG. 2 shows the cache arrangements of FIG. 1 in more detail.

Reference is made to FIG. 2 which schematically show the cache arrangement. A first cache arrangement 12 is provided on a first die with a second cache arrangement 25 on a second die. The first cache arrangement has a cache memory 56 and a cache controller 54 for controlling the cache memory.

The interconnect between the two dies is represented by reference numeral 43. Reference numeral 41 schematically represents the communication path between the cache arrangement 12 of the first die and the interconnect 43. This communication path may include the interface and/or any other circuitry between the cache arrangement 12 and the interconnect 43.

Similarly, reference numeral 39 represents the communication path between the interconnect 43 and the second cache arrangement 25. Again, this communication path may include the interface, and indeed any other suitable circuitry. The cache arrangement 25 of the second die is connected to memory interface 34. Again, a communication path 37 is schematically indicated. In practice, circuitry may additionally or alternatively be provided between the second cache arrangement 25 and the memory interface 34.

The second cache arrangement in one embodiment has a pre-fetch engine 33. In the embodiment shown in FIG. 2, the first cache arrangement 12 does not have a pre-fetch engine. The second cache arrangement has cache memory 50 and a cache controller 52 for storing the cache memory and/or the pre-fetch engine. These are schematically shown in FIG. 2. The cache controller is configured to control the cache memory and pre-fetch engine.

In some embodiments, the communication paths 41, 39 and/or 37 may be bidirectional. Alternatively two separate paths may be provided, one for each direction of traffic. Transactions are issued by initiators. The transactions are routed to targets. The targets may provide responses to the transactions which are routed back to the initiators.

Figure 3:
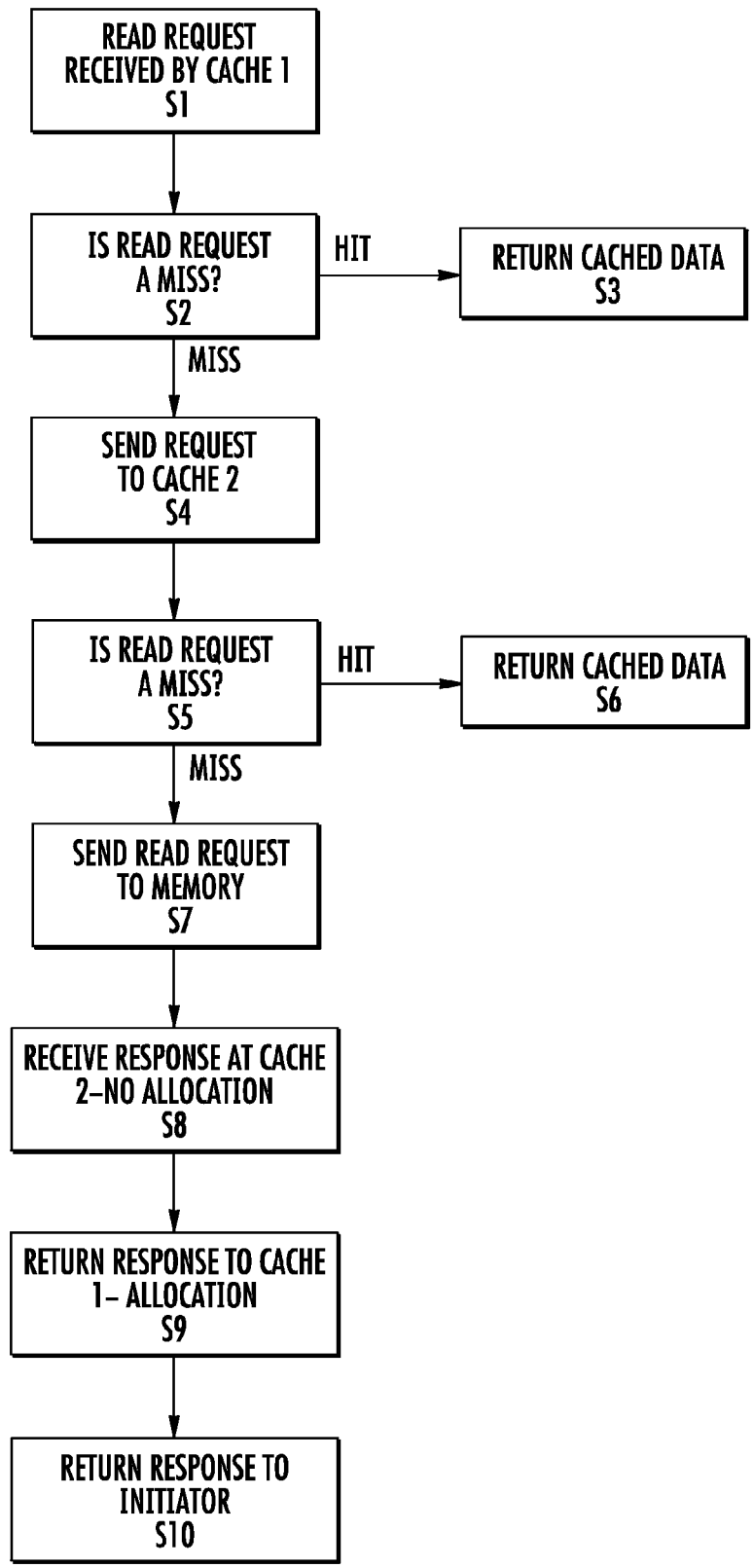
FIG. 3 shows a flow diagram of a first data flow.

Reference is first made to FIG. 3 which shows a first data flow for the arrangement of FIG. 2.

In step S1, a read request is received by the first cache arrangement 12. This read request may be from one of the initiators shown in FIG. 1.

When the cache arrangement 12 receives the read request, a determination is made as to whether or not there is a hit or a miss for the request.

If there is a hit (that is the requested data is already stored in the cache), the next step is step S3 where the cached data is returned from the cache arrangement 12 to the initiator.

If it is determined that there is a miss (i.e. the requested data is not stored in the first cache arrangement 12), then the read request is sent to the second cache arrangement 25.

In step S5, it is determined by the second cache arrangement 25 if the read request is a miss or a hit with respect to that second cache arrangement.

If it is determined that the read request is a hit, the next step is step S6 where the cached data is returned to the first cache arrangement 12. This will be described in more detail with reference to FIG. 4 later.

If it is determined in step S5 that the read request is a miss, the next step would be step S7. In this step, the second cache arrangement 25 will send the read request to the memory via the memory interface 34.

In step S8, the response from the memory, received via the memory interface, is received by the second cache arrangement 25. However, it should be appreciated that no allocation is made at the second cache arrangement 25 for this received data. In other words, the data which is received from the memory in response to the miss request is not stored in the second cache arrangement 25.

In step S9, the response data is returned to the first cache arrangement 12. The first cache arrangement allocates memory to this returned data which is accordingly stored in the first cache arrangement 12.

In step S10, the response is returned to the initiator. In other words, the initiator will receive a response to the request which comprises the data which has been read out of the memory.

Figure 4:
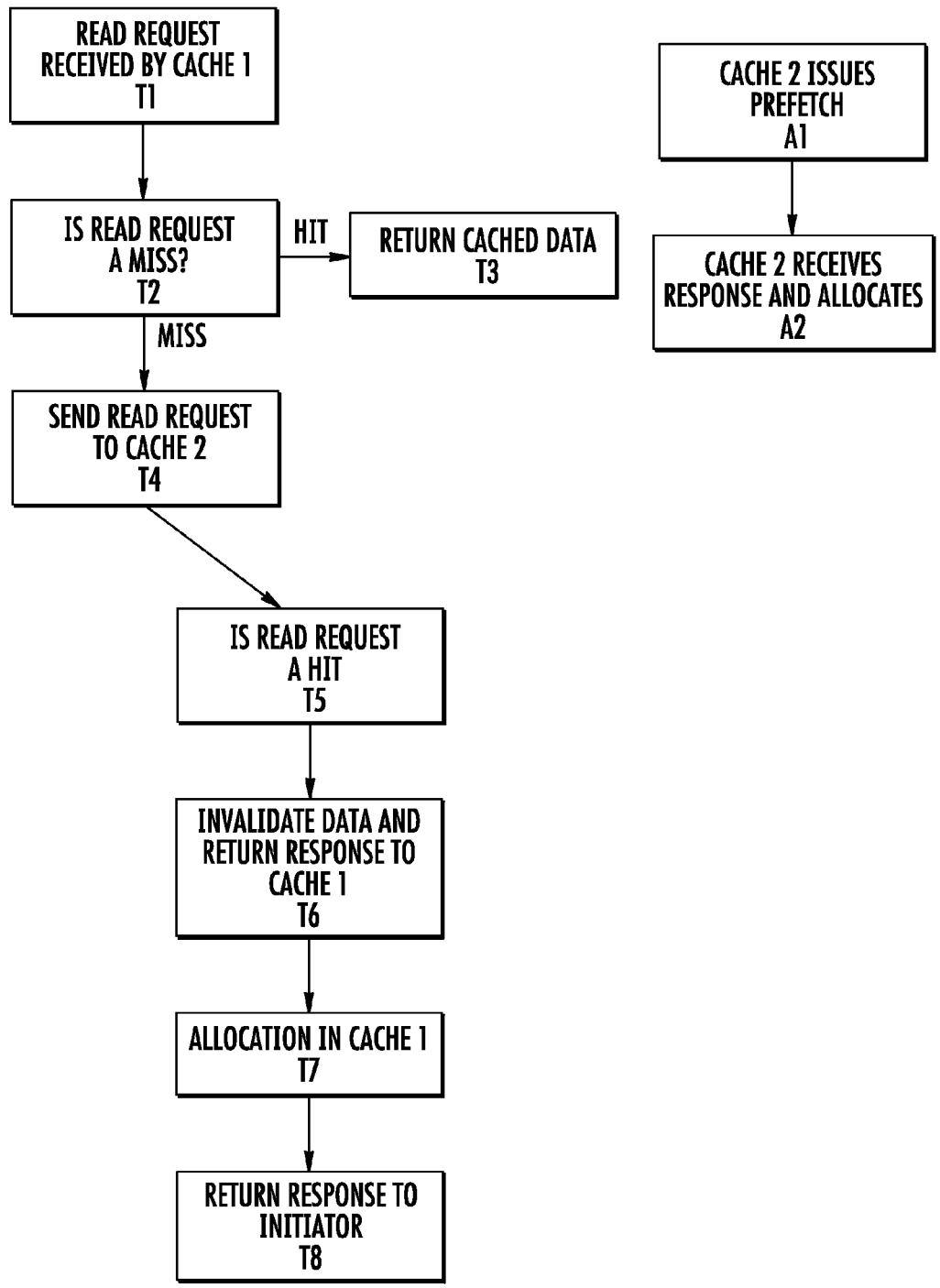
FIG. 4 shows a flow diagram of a second data flow

Reference is now made to FIG. 4 shows a different data flow to that illustrated in FIG. 3. This data flow again may take place in the arrangement shown in FIG. 2. As mentioned previously, the second cache arrangement 25 has a pre-fetch engine 33.

As schematically shown in step A1, the pre-fetch engine 33 will issue pre-fetch requests to the memory 34. This will be based on the read requests which the second cache arrangement 25 has received from the first cache arrangement 12.

In step A2, the second cache arrangement 25 will receive the responses from the memory and will allocate memory space in the second cache arrangement 25 for this pre-fetched data.

Generally the process of steps A1 to A3, will occur at before, after and/or during the flow of FIG. 3 or 4.

Going back to the main flow of FIG. 4, steps T1, T2, T3 and T4 are similar to steps S1, S2, S3 and S4 respectively. Accordingly, these steps will not be described.

In step T5, it is determined that the read request is a hit. In other words, it is determined that there is a data stored in the second cache arrangement which satisfies the read request. This data will have been stored in the second cache arrangement as a result of the pre-fetching described in relation to steps A1 and A2.

In step T6, the data stored in the second cache is invalidated and the response is returned to the first cache arrangement 12. In other words, the data corresponding to the hit is evicted, deleted and/or made invalid.

In step T7, the received data from the second cache arrangement 25 is allocated memory space in the first cache arrangement 12. In other words the data is stored in the first cache arrangement.

In step T8, the response is returned to the initiator.

Accordingly, in some embodiments, a cache arrangement will sit on either side of the interconnect.

In response to a miss, the data is fetched by the cache on the same side of the interconnect as the requesting initiator (i.e. the first cache arrangement 12). The cache on the other side of the interconnect, that is the second cache arrangement will initiate pre-fetches. Accordingly, the interconnect 43 is not used for any speculative pre-fetch requests. The second cache arrangement will perform the speculative pre-fetch requests.

If a memory location in the second cache arrangement is requested, the second cache arrangement will respond and evict the line from itself. In this way, data from a particular location in the memory is not stored in both of the cache memories but rather in a single one of the cache memories.

Accordingly, in some embodiments, the first cache arrangement may contain data from genuine requests from the initiator whilst the cache arrangement on the second die may contain data from speculative pre-fetches.

In some embodiments, the cache arrangement may be a standard cache having level N. The first cache arrangement may have no pre-fetch mechanism. The first cache arrangement may use known allocation policies.

The second cache arrangement may be a cache at level N+1. The level is indicates the hierarchical distance from the original requestor. e.g. L1 is closest, L2 further than L1 but closer than L3. The second cache arrangement may be exclusive with the first cache arrangement. Exclusivity in cache hierarchy means that an address is allocated in one and only one cache memory.

The second cache arrangement may not allocate on reads and/or write. The second cache arrangement will allocate on pre-fetches.

The allocation in the first and/or the second cache may be based on address and/or quality of service. This may be carried out in one or more of steps S9, T7, and A2.

In a set associative cache a address can be allocated to several locations in the cache memory (e.g. in a four way set associative cache the controller can choose from a set of four possible cache locations to allocate the data into for any particular address). It should be appreciated that four is by way of example only and alternative embodiments may be used with an n way set associative cache where n is 2 or more. The quality of service QoS may play a role in this allocation. For example the cache controller may allocate data from higher priority transactions into any set, but may restrict lower priority transactions to being allocated into a reduced set. This may have the effect of making the cache capacity greater for the higher QoS transactions than the lower QoS transactions. In some embodiments, the more ways in which the controller can allocate an address, the lower the chance that a line is evicted due to an addressing conflict (where two addresses resolve to the same location in the cache memory).

Each pre-fetch may have a quality of service associated therewith. The quality of service may depend on one or more of a pre-fetch distance from a cache miss, how recently a preceding address has been used, how recently a range of cache lines has been used or on a quality of service of an associated cache miss.

The quality of service may be provided as part of the pre-fetch in one embodiment. In another embodiment, the quality of service may be determined on the basis of which input a memory request is received at the first cache and/or the second cache. Each input to the first and/or the second cache may be associated with a different quality of service.

In some embodiments, there may be a pre-fetch mechanism associated the first cache. The arrangement may have the cache pre-fetching ahead of the first cache. For example, when the first cache generates the pre-fetch the second cache can respond faster than if the prefetch accesses memory directly. The second cache may have a lower latency to the memory than the first cache as the second cache is physically closer. Prefetches from the first cache may hit in the second cache since the second cache may perform the prefetches to the same addresses more quickly than the first cache.

In some embodiments, some data is not allocated to a cache memory. This may mean that the data is not stored in a cache memory, is only temporarily stored or is stored but marked with an indication that said data is not valid.

In some embodiments, data in the cache memory is described is being invalidated. This may mean that the data is deleted or marked with an indication that the data is not valid.

The described embodiments have referred to read requests. However, this is by way of example only and embodiments may alternatively or additionally be used for any suitable memory transactions.

Embodiments have been described in the context of an arrangement where two dies are provided and the two cache arrangements are provided on a separate die. It should be appreciated that alternative embodiments may be provided on a single integrated circuit, or may be used to facilitate communication between two or more integrated circuits.

Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A first cache arrangement comprising:
an input configured to receive a read memory request;
a first cache memory for storing data;
an output configured to provide a response to the read memory request; and
a first cache controller configured to
determine whether said first cache memory includes stored data corresponding to the read memory request,
retrieve the stored data corresponding to the read memory request from said first cache memory when said first cache memory includes the stored data corresponding to the read memory request,
send the read memory request to a second cache arrangement when said first cache memory does not include the stored data corresponding to the read memory request, the second cache arrangement comprising a pre-fetch engine configured to, independently from the first cache controller, perform at least one pre-fetch of the stored data based upon the read memory request, a second cache memory, and a second cache controller coupled to the pre-fetch engine and the second cache memory, the second cache controller configured to, independently from said first cache controller, allocate the stored data from the at least one pre-fetch in the second cache memory and invalidate the stored data allocated from the at least one pre-fetch when the stored data is for the read memory request,
receive the stored data corresponding to the read memory request from the second cache arrangement when the second cache arrangement includes the stored data corresponding to the read memory request, receive the stored data corresponding to the read memory request from a memory via the second cache arrangement when the second cache arrangement does not include the stored data corresponding to the read memory request and without an allocation for the stored data being made in the second cache arrangement, and send the stored data via the output.

2. A first cache arrangement as claimed in claim 1, wherein the second cache controller is configured to allocate the stored data from the at least one pre-fetch based upon at least one of a memory address and a quality of service.

3. A first cache arrangement as claimed in claim 2, further comprising a set associative cache, and a number of sets available for data associated with the at least one pre-fetch is based upon the quality of service.

4. A first cache arrangement as claimed in claim 3, wherein the quality of service is based upon at least one of a pre-fetch distance, how recently a preceding address has been used, and how recently a range of cache lines has been used.

5. A cache system comprising:
a first cache arrangement comprising
a first cache memory for storing data, and
a first cache controller coupled to said first cache memory; and
a second cache arrangement coupled to said first cache arrangement and comprising
a pre-fetch engine;
a second cache memory for storing data, and
a second cache controller coupled to said second cache memory and said pre-fetch engine;
said first cache controller configured to
determine whether said first cache memory includes stored data corresponding to a read memory request,
retrieve the stored data corresponding to the read memory request from said first cache memory when said first cache memory includes the stored data corresponding to the read memory request,
send the read memory request to said second cache arrangement when said first cache memory does not include the stored data corresponding to the read memory request,
said pre-fetch engine configured to, independently from said first cache controller, perform at least one pre-fetch of the stored data based upon the read memory request;
said second cache controller configured to, independently from said first cache controller,
allocate the stored data from the at least one pre-fetch in said second cache memory, and
invalidate the stored data allocated from the at least one pre-fetch when the stored data is for the read memory request;
said second cache controller further configured to, independently from said first cache controller
determine whether said second cache memory includes the stored data corresponding to the read memory request,
send the stored data from said second cache memory to said first cache memory arrangement when said second cache memory includes the stored data corresponding to the read memory request, and
when said second cache memory does not include the stored data corresponding to the read memory request
send the read memory request to a memory, and
send the stored data from the memory to said first cache arrangement without an allocation being made for the stored data.

6. A cache system as claimed in claim 5, further comprising at least one interconnect coupling said first and second cache arrangements.

7. A method comprising:
using a first cache controller coupled to a first cache memory of a first cache arrangement to
determine whether the first cache memory includes stored data corresponding to a read memory request,
retrieve the stored data corresponding to the read memory request from the first cache memory when the first cache memory includes the stored data corresponding to the read memory request,
send the read memory request to a second cache arrangement when the first cache memory does not include the stored data correspond to the read memory request, the second cache comprising a pre-fetch engine configured to, independently from said first cache controller, perform at least one pre-fetch of the stored data based upon the read memory request, a second cache memory, and a second cache controller coupled to the pre-fetch engine and the second cache memory, the second cache controller configured to, independently from said first cache controller, allocate the stored data from the at least one pre-fetch in the second cache memory and invalidate the stored data allocated from the at least one pre-fetch when the stored data is for the read memory request,
receive the stored data corresponding to the read memory request from the second cache arrangement when the second cache arrangement includes the stored data corresponding to the read memory request, and
receive the stored data corresponding to the read memory request from a memory via the second cache arrangement when the second cache arrangement does not include the stored data corresponding to the read memory request and without an allocation for the stored data being made in the second cache arrangement.

8. A method as claimed in claim 7, wherein the second cache controller is used to allocate the stored data based upon at least one of a memory address and a quality of service.

9. A method as claimed in claim 8, wherein the quality of service is based upon at least one of a pre-fetch distance, how recently a preceding address has been used, and how recently a range of cache lines has been used.

10. A method comprising:
using a first cache controller of a first cache arrangement to
determine whether a first cache memory of the first cache arrangement includes stored data corresponding to a read memory request,
retrieve the stored data corresponding to the read memory request from the first cache memory when the first cache memory includes the stored data corresponding to the read memory request,
send the read memory request to a second cache arrangement when the first cache memory does not include the stored data corresponding to the read memory request;
using a pre-fetch engine of the second cache arrangement to, independently from using the first cache controller, perform at least one pre-fetch of the stored data based upon the read memory request;
using a second cache controller of the second cache arrangement to, independently from using the first cache controller, allocate the stored data from the at least one pre-fetch in a second cache memory of the second cache arrangement, and invalidate the stored data allocated from the at least one pre-fetch when the stored data is for the read memory request; and using the second cache controller of the second cache arrangement to determine whether a second cache memory of the second cache arrangement includes the stored data corresponding to the read memory request, send the stored data from the second cache memory to the first cache memory arrangement when the second cache memory includes the stored data corresponding to the read memory request, and when the second cache memory does not include the stored data corresponding to the read memory request send the read memory request to a memory, and send the stored data from the memory to the first cache arrangement without an allocation being made for the stored data.

\* \* \* \* \*